ary switches
UNITED STATES PATENT OFFICE.

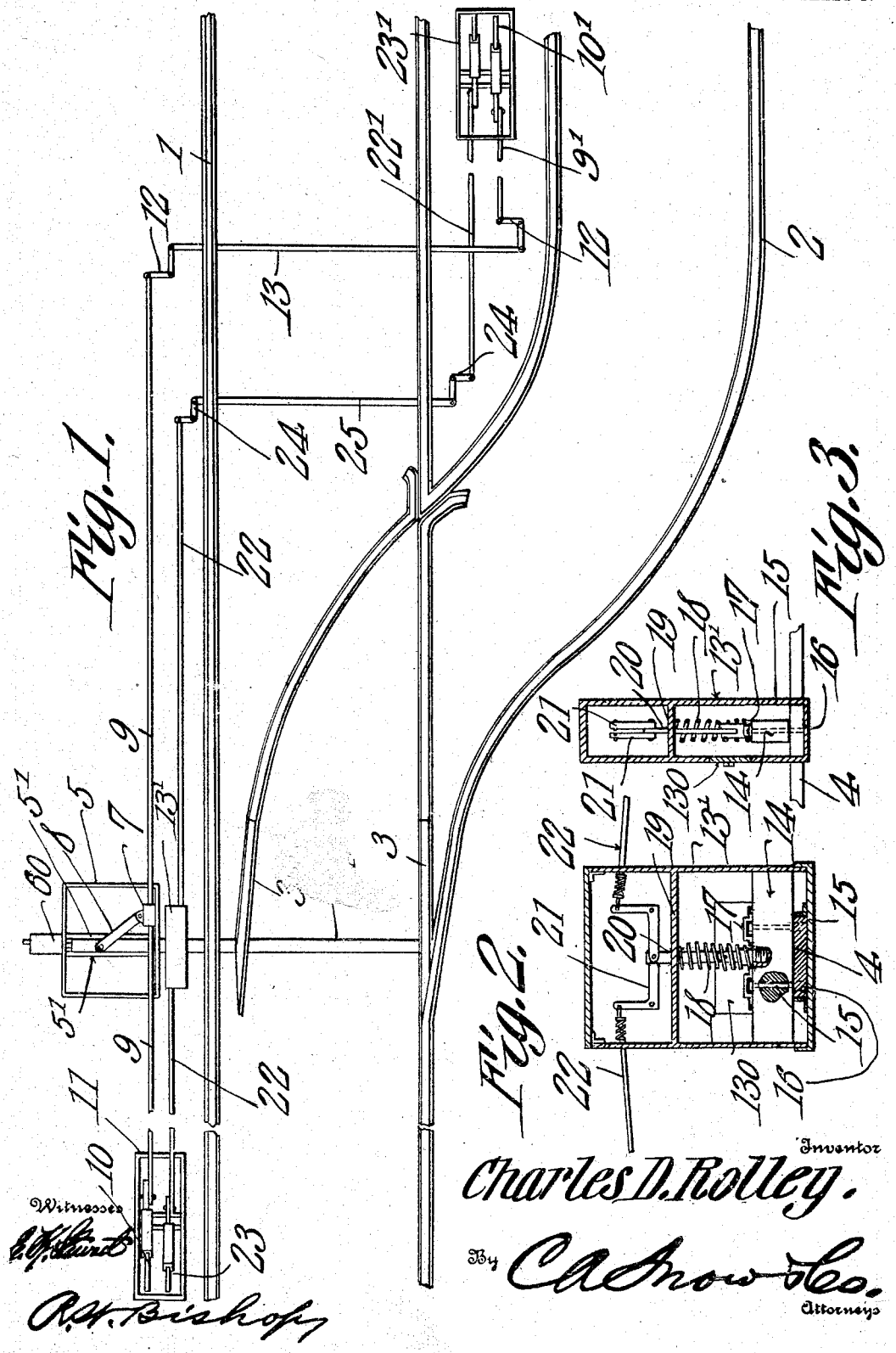

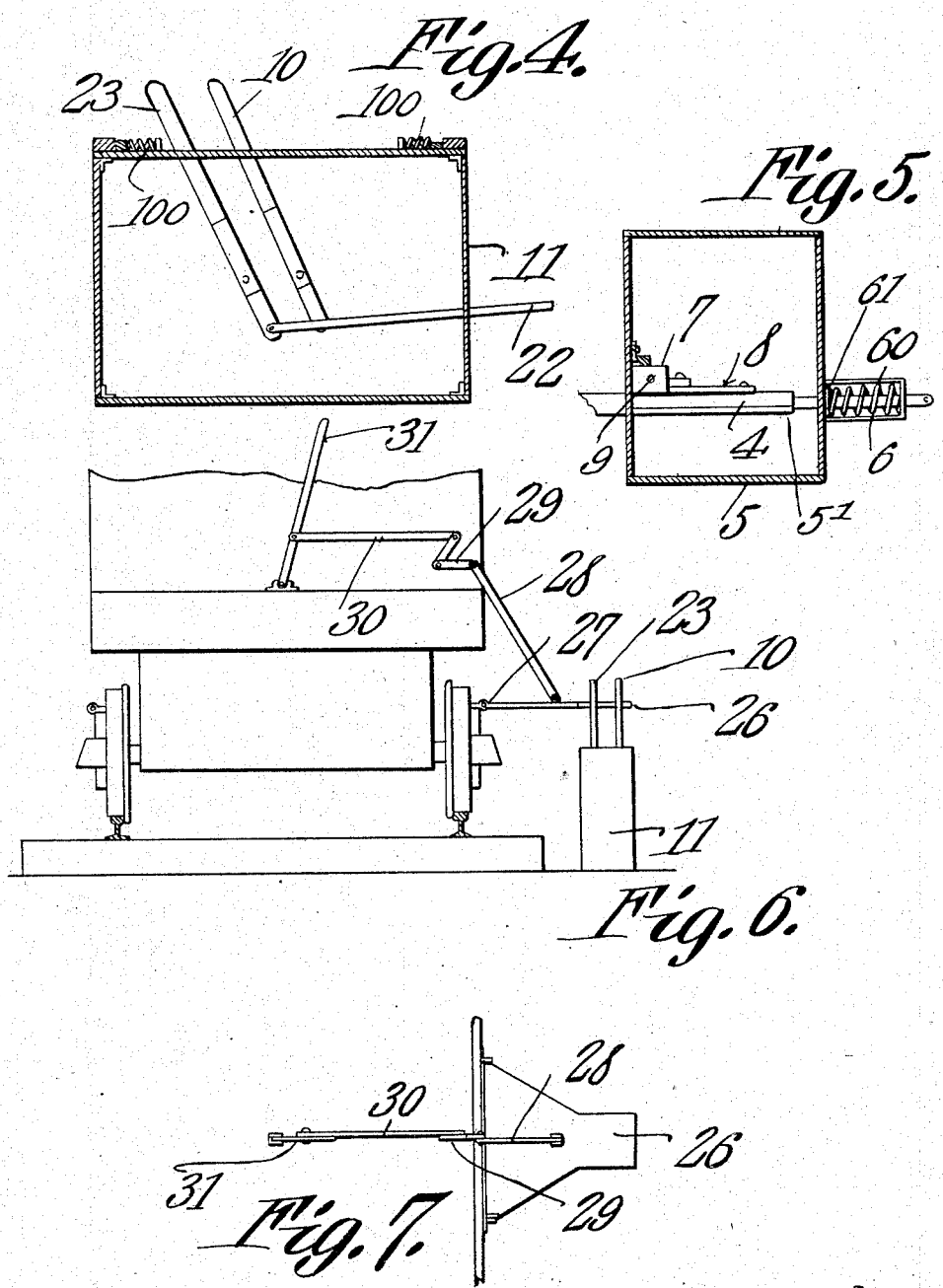

CHARLES DEVALL ROLLEY, OF KIRKERSVILLE, OHIO.

AUTOMATIC SWITCH.

950,826.  Specification of Letters Patent.  Patented Mar. 1, 1910.

Application filed November 1, 1909. Serial No. 525,779.

*To all whom it may concern:*

Be it known that I, CHARLES D. ROLLEY, a citizen of the United States, residing at Kirkersville, in the county of Licking and State of Ohio, have invented a new and useful Automatic Switch, of which the following is a specification.

This invention relates to railway switches and the object of the invention is to provide an efficient switch intended more particularly for use upon suburban trolley lines in which the switch will be automatically operated by a passing car when it is desired to have the said car pass onto a siding.

A further object of the invention is to provide means whereby the switch will be locked against movement occurring prematurely or at improper times and will be released from its locked position before being operated to permit the car to pass onto the siding.

These objects, and such other incidental objects as will hereinafter appear, are attained by the use of the device illustrated in the accompanying drawings, and the invention consists in certain novel features of the same as will be hereinafter first fully described and then particularly pointed out in the appended claims.

In the annexed drawings, Figure 1 is a plan view of a railway switch constructed in accordance with my invention. Fig. 2 is a side elevation of the locking device with the housing in section. Fig. 3 is an end elevation of the locking device with its housing in section. Fig. 4 is a detail view of the operating levers. Fig. 5 is a side view of the switch point connecting bar and the operating devices connected thereto the housing for the same being in section. Fig. 6 is a detail elevation of the device for throwing the operating levers, and Fig. 7 is a detail plan view of the said actuating device.

The main track 1 and the siding 2 may be made in any desired manner and constitute no part of my invention, the switch points 3 being connected by the usual transversely disposed point-connecting bar 4, as will be readily understood. This point-connecting bar 4 extends laterally beyond one side of the track and passes through a box or housing 5, working between guides 5' therein by which it will be prevented from springing laterally when the switch is being operated. The end of the bar projects into a lateral cylindrical extension 60 of the box and a spring 6 is coiled around the bar between the end of this extension and a washer 61 on the bar and presses upon the washer and the bar so as to normally hold the switch closed. In order to move the said connecting bar 4 in opposition to the said spring and thereby open the switch, I employ a slide 7 which is mounted in the housing 5 and arranged to move parallel with the main track and is connected to the connecting bar 4 by a link 8, as clearly shown. The slide 7 normally lies to one side of the connecting bar 4 so that the spring 6 will hold the said bar inward and consequently maintain the switch points 3 in closed position. If the slide be moved toward the connecting bar the outer end of the link 8 will be swung toward the outer side of the housing 5 and consequently the connecting bar 4 will be moved against the tension of the spring 6 and the switch points 3 moved so as to open the switch, as will be readily understood. In order to effect this desired movement of the slide 7, operating rods 9 are connected to the said slide and extend in opposite directions therefrom any desired distance, one of the said rods 9 being pivotally attached to the lower end of the throwing lever 10 which is pivoted within a housing or switch stand 11 at the side of the main track while the other rod 9 is connected through a series of angle levers 12 and links 13 with a similar rod 9' connected to a second throwing lever 10' at the side of the siding 2.

It will be readily seen from the description of the apparatus thus far given, that when a car approaches the lever 10 if the said lever be thrown the switch will be opened and the car guided onto the siding and as the car passes onto the siding if the lever 10' be thrown the switch points will be restored to their normal position. The levers 10 and 10' will always be opened simultaneously owing to the fact that they are both connected to the slide 7 and consequently when either lever is operated to move the slide the other lever will follow the said movement.

In order to lock the connecting bar 4 in its normal position so as to hold the switch normally closed, I employ the device illustrated more in detail in Figs. 2 and 3 and which I will now describe. A housing 13' is arranged at the side of the track adjacent to the box 5, and within the said housing I provide a vertically movable cross head 14 carrying locking pins 15 which are adapted to engage openings 16 in the connecting bar 4 which passes through the housing below the cross head 14. These pins are inserted through the cross head and secured by clasps or caps 17 which are hinged upon the upper side of the cross head and fit over the upper ends of the pins, as shown clearly in Fig. 2. The caps may be secured in position over the pins by any convenient or preferred means which may be readily released so that if it be desired to operate the switch by hand, the caps may be raised and the pins removed whereupon the point-connecting bar 4 may be operated without hindrance from the locking mechanism. In order that access for this purpose may be had to the housing a door 130 is provided in the side of the housing and this door will be normally locked so that it can be opened only by authorized persons who will be furnished with keys.

The cross head is held normally toward the connecting bar 4 by a spring 18 arranged between the said bar and a horizontal partition 19 within the housing 13' and in order to lift the cross head so as to disengage the locking pins from the connecting bar a pitman 20 is secured to the cross head and extends up through the partition 19 and is pivotally connected at its upper end with angle levers 21 fulcrumed within the housing 13' and each having its upper end attached to a connecting rod 22 extending along the track any desired distance. One of these rods 22 is pivoted to the lower end of a locking lever 23 while the other rod is connected through a series of angle levers 24 and a link 25 to a similar rod 22' pivoted to a second locking lever 23'. The locking lever is fulcrumed within the housing or switch stand 11 but is arranged therein at a point in advance of the switch throwing lever 10 so that when the levers are operated from the passing car the locking lever will be first manipulated to release the locking device from the point-connecting bar and the switch throwing lever will then be operated to throw the switch. The locking lever 23' is similarly disposed with respect to the throwing lever 10' so that after the car passes onto the siding the switch will be first thrown to its normal position and then locked in that position, as will be readily understood. This arrangement furthermore facilitates the backing of the car from the siding onto the main track in cases where the siding is a blind or stub siding. Upon the top of the stand 11, I provide springs 100 which are arranged at the sides of the stand in the paths of the levers. When the levers are depressed, they will be brought against these springs which, by their expansion, will slightly raise the levers after the car has passed in order that the next car may successfully actuate them.

In order to operate the switch from the car without requiring the motorman or the conductor to leave the car or necessitating any stopping of the car, I employ an actuator which is mounted upon the boxing and operated from the platform of the car. This actuator consists of a plate or arm 26 hinged, as at 27, to the boxing and connected by a link 28 to an angle lever 29 mounted on the car and connected by a link 30 with a hand lever 31 provided on the platform within convenient reach of the motorman. In its normal position this actuating arm or plate 26 will be held up against the side of the car but should it be desired to operate the switch the lever 31 is thrown to the position illustrated in Fig. 6 whereupon the links 30 and 28 will be moved through their connections with the said lever and the angle lever 29 to lower the arm or plate 26 into the path of the levers 10 and 23. It will thus be seen that as the car approaches the switch the actuator will be brought against the levers 23 and 10 successively and the said levers consequently vibrated so as to pull upon the rods 22 and 9 and thereby first unlock the switch and then throw the same. After the car passes onto the siding the actuator will impinge against the levers 10' and 23' successively so as to first return the switch to its initial position and then lock the same so that the main track will again be clear, as will be readily understood.

My device is extremely simple in its construction and its use will result in a pronounced saving of time in the operation of trolley or other car systems as the stopping of the car in order to operate the switch will be rendered unnecessary and the conductor and the motorman may consequently remain upon the car so that the car will be stopped only so long as may be necessary to permit the meeting car to pass. The point-connecting bar is formed with a suitable opening at its end whereby it may be connected with a target or a signal light. The pitman 20 is preferably made in two sections, as shown most clearly in Fig. 3, to facilitate the assembling and dismantling of the parts.

Having thus described my invention, what I claim is:

1. The combination of switch rails, a housing at one side of the rail, a connecting bar secured to the rails and extending through the housing, a spring beyond the housing acting upon the outer end of the connecting bar to hold it in its normal position, guides for said bar within the housing, a slide disposed at one side of the connecting bar within the housing and arranged to move at right angles to the said bar, a link having its opposite ends pivoted respectively to the said slide and the said connecting bar, and means for operating the said slide to move the connecting bar in opposition to the spring.

2. The combination of switch rails, a connecting bar secured thereto, means for operating the said bar, a slidable cross head mounted above the said bar, locking pins extending through and carried by the said cross head and adapted to engage the said connecting bar, a spring acting on the said cross head to hold the same normally to the bar, and means for lifting the said cross head in opposition to the said spring.

3. The combination of switch rails, a connecting bar secured thereto, means for operating the said bar, a cross head arranged above the said bar, removable locking pins carried by said cross head and adapted to engage the connecting bar, a spring mounted above the said cross head and holding the same normally toward the connecting bar, a pitman secured to and rising from the cross head, angle levers pivoted to the upper end of the said pitman and disposed at opposite sides of the same, and operating devices connected to the free ends of the said angle levers.

4. The combination of switch rails, a connecting bar secured thereto, means for operating the said bar, a cross head arranged above the said bar, locking pins fitted loosely in the said cross head and adapted to engage the connecting bar, the said pins being provided with heads at their upper ends adapted to rest on the cross head, caps secured on the cross head and adapted to fit over the heads of the locking pins, a spring mounted above the said cross head and holding the same normally toward the connecting bar, a pitman secured to and rising from the cross head, and operating devices connected to the upper end of said pitman to move the cross head in opposition to the spring.

In testimony that I claim the foregoing as my own, I have hereto affixed by signature in the presence of two witnesses.

CHARLES DEVALL ROLLEY.

Witnesses:
W. A. BLAIN,
C. E. BISHOP.